United States Patent [19]

Nishikawa et al.

[11] Patent Number: 5,106,151
[45] Date of Patent: Apr. 21, 1992

[54] CANVAS TOP TYPE SUNROOF STRUCTURE FOR MOTOR VEHICLE

[75] Inventors: Hiromitsu Nishikawa; Yuichi Kato, both of Yokohama; Kazunori Kawamo, Ebina, all of Japan

[73] Assignees: Ohi Seisakusho Co., Ltd., Yokohama; Nissan Shatai Company, Limited, Hiratsuka, both of Japan

[21] Appl. No.: 453,275

[22] Filed: Dec. 22, 1989

[30] Foreign Application Priority Data

Dec. 28, 1988 [JP] Japan ................. 63-334684

[51] Int. Cl.⁵ .......................... B60J 7/06; B60J 7/185
[52] U.S. Cl. ..................................... 296/219; 296/224
[58] Field of Search ............... 276/219, 220, 223, 224

[56] References Cited

U.S. PATENT DOCUMENTS 2,025,874 12/1935 Lange ................................ 296/219
3,658,378 4/1972 Sutren ........................... 296/223 X

FOREIGN PATENT DOCUMENTS

| 1150585 | 9/1958 | Fed. Rep. of Germany | 296/219 |
| 61-33721 | 3/1986 | Japan . | |
| 0257626 | 10/1989 | Japan | 296/219 |
| 465339 | 4/1937 | United Kingdom | 296/224 |
| 1310505 | 3/1973 | United Kingdom | 296/219 |
| 1539906 | 2/1979 | United Kingdom | 296/219 |

Primary Examiner—Dennis H. Pedder
Attorney, Agent, or Firm—Foley & Lardner

[57] ABSTRACT

A canvas top type sunroof structure is disclosed, which comprises a pair of guide members which extend along respective sides of a sunroof aperture; a canvas top adapted to cover the aperture; a carry member having a terminal part of the canvas top secured thereto, the carry member being slidably guided by the guide members; a latching device for latching the carry member to one end of the aperture when the carry member comes to a given terminal position relative to the aperture; and a brake mechanism for restraining the carry member to one of the guide members when the carry member assumes a position other than the given terminal position.

16 Claims, 12 Drawing Sheets

CANVAS TOP TYPE SUNROOF STRUCTURE FOR MOTOR VEHICLE

BACKGROUND OF THE INVENTION

1. Field of the Invention

The present invention relates in general to sunroof structures of a motor vehicle, and more particularly, to sunroof structures of a canvas top type which uses a canvas as a folding top which is adapted to close an aperture formed in a roof of the vehicle.

2. Description of the Prior Art

Hitherto, various types of sunroof structures have been proposed and put into practical use particularly in the field of wheeled motor vehicles. Some of them are of a so-called "canvas top" type which uses a canvas as the folding top for closing the roof aperture of the vehicle. One of the sunroof structures of this type is disclosed in Japanese Utility Model First Provisional Publication No. 61-33721.

The sunroof structure of this publication comprises generally a folding canvas top carried on supporting bows, a pair of guide members extending along respective sides of the sunroof aperture to guide forward and rearward movements of the supporting bows, a front carry member connected to a front end of the canvas top and slidably guided by the guide members, a cable-type drive device for moving the front carry member forward and rearward upon operation thereof, and a manually operated handle for operating the drive device. A rear end of the canvas top is fixed to a rear end of the sunroof aperture.

When, opening the aperture, the manual handle is manipulated and, the front carry member is gradually moved rearward while forming several folds of the canvas top at a rear part of the same. When the manipulation of the handle stops, the rearward movement of the front carry member stops. Under this, due to the nature of a speed reduction mechanism employed in the sunroof structure, the front carry member is restrained at a position permitting the canvas top to assume a so-called "half-open restrained" position. When the manual handle is further manipulated, the front carry member is moved to its rearmost position allowing the canvas top to assume its full-open position.

However, due to its inherent construction, the conventional sunroof structure has the following drawbacks.

That is, since the folds of the canvas top, which are formed upon full-opening of the same, are inevitably placed at the rear portion of the sunroof aperture, the passengers on rear seats of the vehicle cannot enjoy a sufficiently large open space above them. In fact, under the full-open condition of the sunroof structure, the folds of the canvas top are placed over the rear seat passengers.

In order to solve this drawback, a measure has been proposed by the same applicants (which is disclosed in U.S. patent application No. 07/334,285 filed on Apr. 6, 1989) in which the opening movement of the canvas top is available from not only the front part thereof but also the rear part thereof. That is, in the measure proposed in the Application, there is employed a rear carry member which has a rear end of the canvas top secured thereto. The rear carry member is slidable along the paired guide members and detachably connected to the rear end of the sunroof aperture. Thus, if required, the rear carry member is detatched from the rear end of the aperture and pushed forward to a so-called "rear open position" providing a sufficiently wide open space above the rear seat passengers.

However, in the measure desclosed in the prior Application, there is no special means for assuredly holding the rear carry member at the rear open position.

Thus, when, with the sunroof structure assuming the rear-open condition and, the vehicle runs at high speed or subjected to rapid braking, the rear carry member is unexpectedly moved rearward or forward.

SUMMARY OF THE INVENTION

It is an object of the present invention to provide a sunroof structure which is free of the drawback possessed by the above-mentioned prior application.

It is an object of the present invention to provide a sunroof structure which is provided by putting an improvement into the sunroof structure prior proposed by the same applicants.

According to the present invention, there is provided a sunroof structure in which a brake mechanism is employed by which a rear carry member of a canvas top is brakingly retained to the vehicle roof even when the rear carry member is kept separated from the rear end of the sunroof aperture assuming an open position thereof.

According to the present invention, there is provided a sunroof structure for a vehicle having an aperture formed in a roof of the vehicle. The sunroof structure comprises a pair of guide members which extend along respective sides of the aperture; a canvas top adapted to cover the aperture; a carry member having a terminal part of the canvas top secured thereto, the carry member being slidably guided by the guide members; latching means for latching the carry member to one end of the aperture when the carry member comes to a given terminal position relative to the aperture; and a brake mechanism for restraining the carry member to one of the guide members when the carry member assumes a position other than the given terminal position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings. In the description, the terms, such as, front, rear, right, left, forward, rearward and the like are to be understood with respect to a motor vehicle on which the sunroof structure is mounted.

Figure 14:
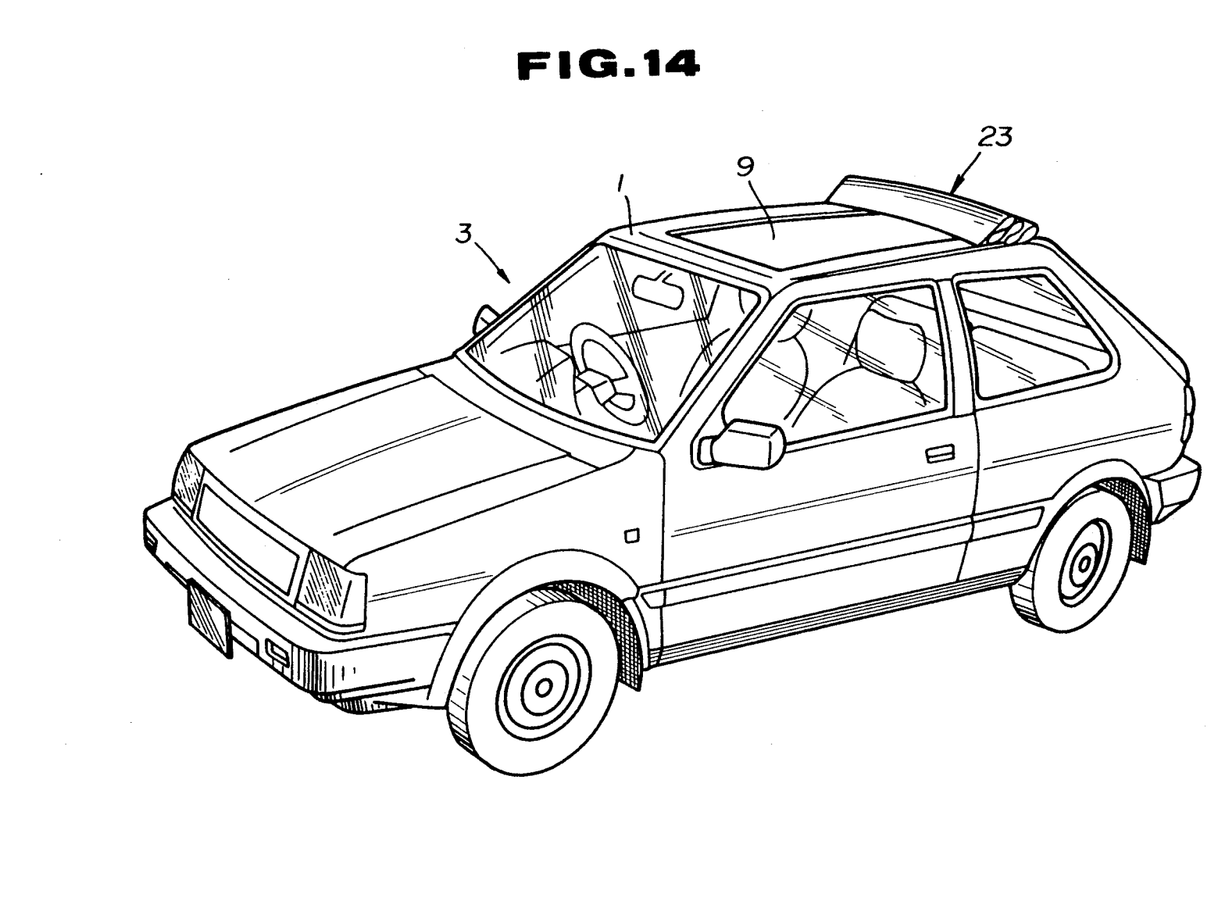
FIG. 14 is a perspective view of a motor vehicle to which the canvas top type sunroof structure of the present invention is applied.

Referring to FIG. 14, there is shown a passenger motor vehicle 3 to which a canvas top type sunroof structure of the present invention is practically mounted. As shown, the vehicle 3 has a rectangular aperture 9 formed in a roof 1 thereof.

The sunroof structure comprises generally a pair of (viz., right and left) guide mechanisms which are respectively arranged at lateral sides of the aperture 9 and a canvas top 23 which is slided axially by the guide mechanisms between a full-close position and a full-open position, as will become clarified as the description proceeds.

Since the paired guide mechanisms are substantially the same in construction except for the orientation of parts which constitute each mechanism, the following description will be made with respect to only one of the guide mechanisms, that is, the left mechanism.

The guide mechanism comprises a guide member 7 which is secured to the roof 1 and extends along the left side edge of the aperture 9. As is seen from FIG. 1, the guide member 7 comprises a first rail part 13 and a second rail part 15 which extend in parallel with each other. The first rail part 13 has two (viz., outside and inside ) cable guide grooves 11 and 11 which face in opposite directions and two (viz., outside and inside) slider guide grooves 12 and 12 which face in opposite directions. As is seen from FIG. 4, the slider guide grooves 12 and 12 have respective rear ends 91 which are bent downward, for the reason which will be clarified hereinafter.

Figure 7:
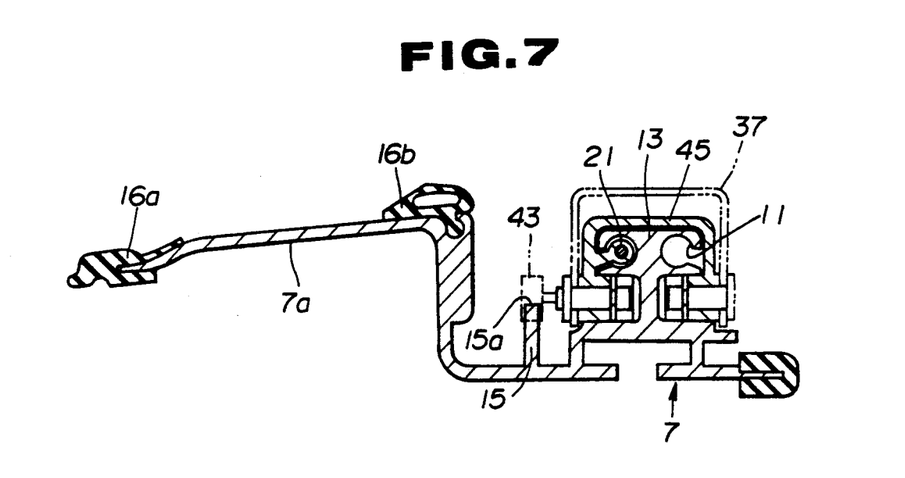
FIG. 7 is a sectional, but enlarged, view taken along the line VII—VII of FIG. 2.
Figure 8:
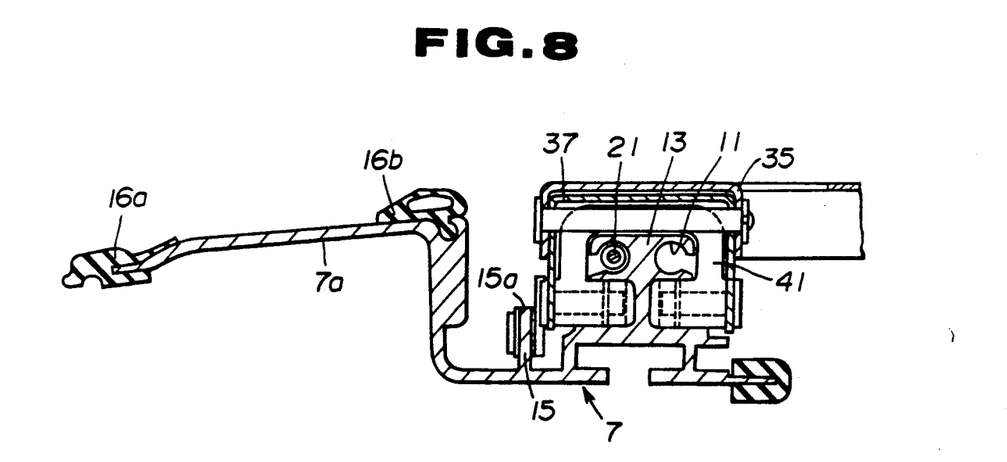
FIG. 8 is a sectional, but enlarged, view taken along the line VIII—VIII of FIG. 2.
Figure 9:
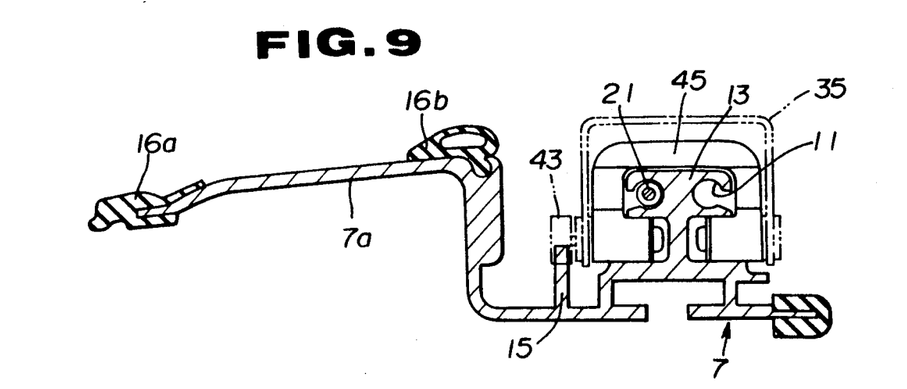
FIG. 9 is a sectional, but enlarged, view taken along the line IX—IX of FIG. 2.

As is seen from FIG. 7, the guide member 7 has further an outwardly extending flange portion 7a on which two longitudinally extending weather strips 16a and 16b are mounted. The upper surface of the second rail part 15 is flattened to constitute a rail surface 15a.

Figure 13:
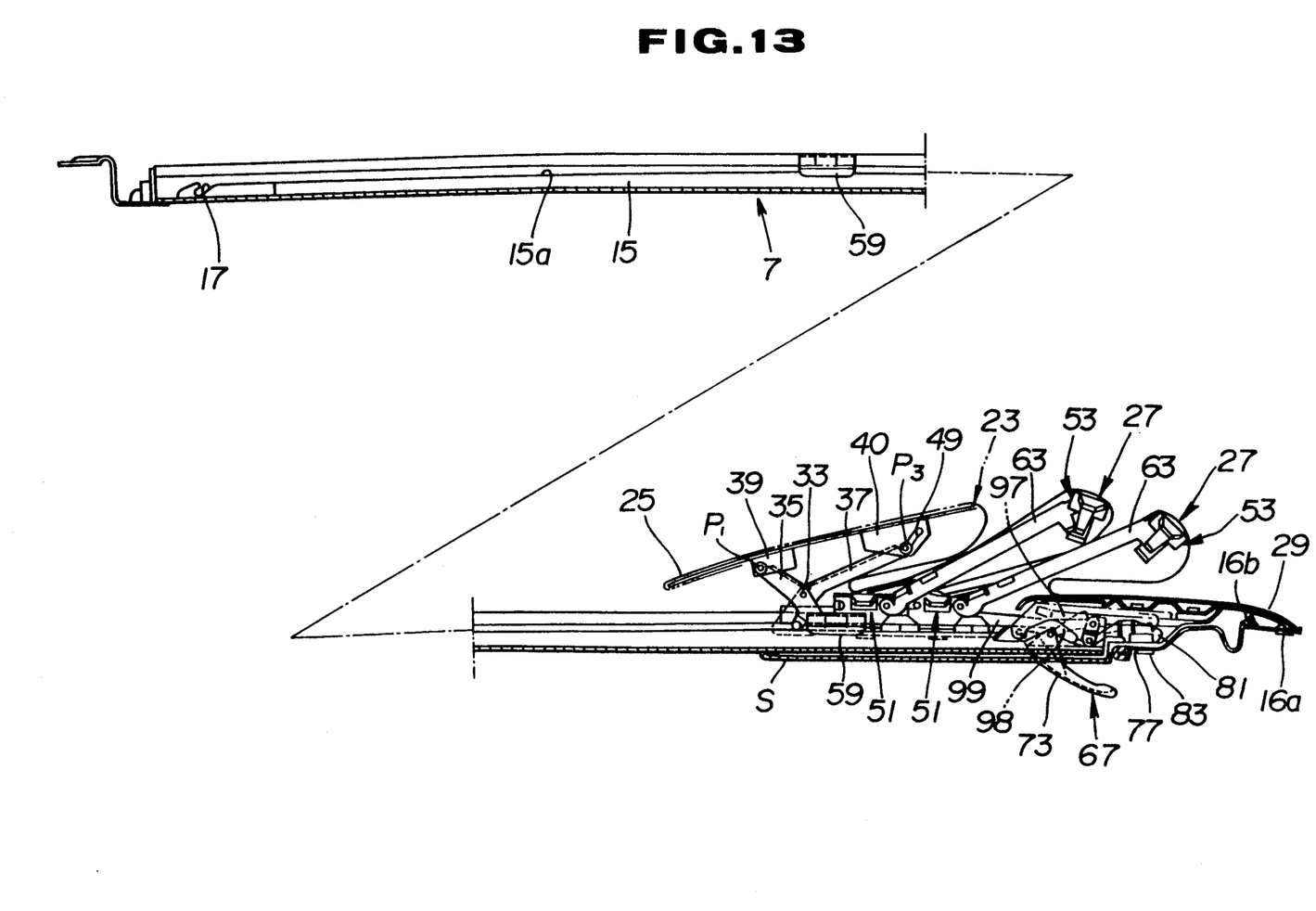
FIG. 13 is a view similar to FIG. 2, but showing the fully open condition of the sunroof structure.

As is seen from FIG. 13, the second rail part 15 has at its front portion a smoothly curved recess 17 to which the rail surface 15a falls.

Figure 15:
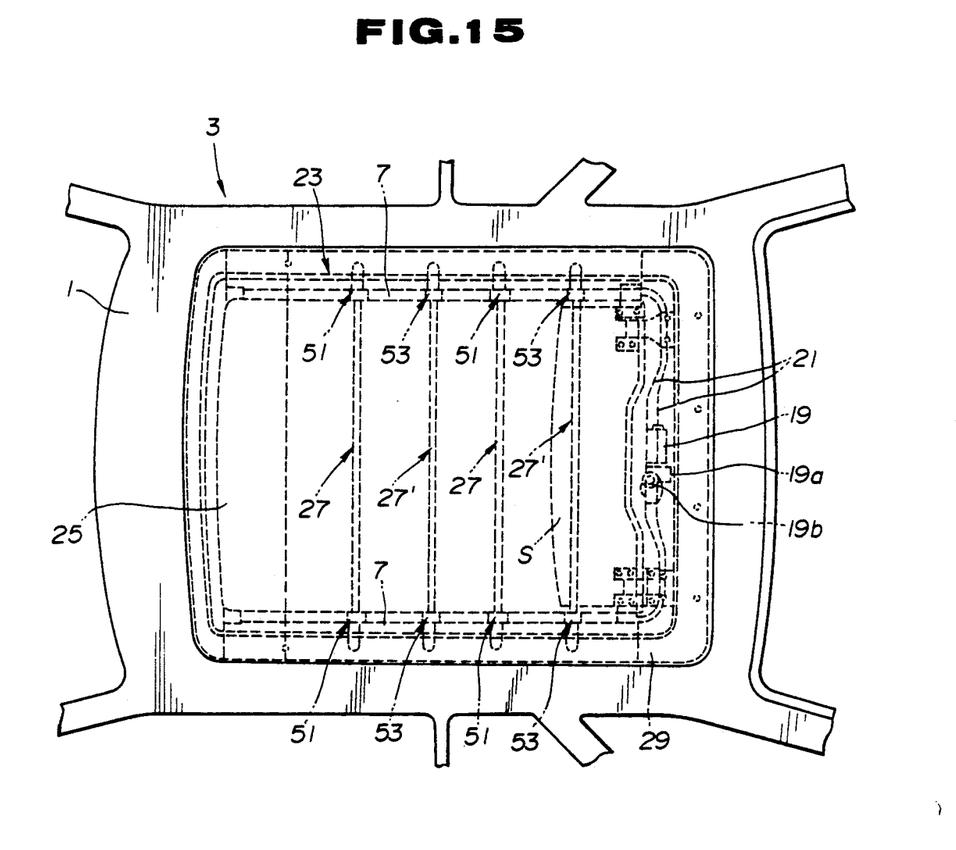
FIG. 15 is a plan view of the canvas top type sunroof structure of the present invention in a condition wherein the canvas top fully closes the roof aperture.

As is seen from FIG. 15, a reversible electric motor 19 is mounted to a rear portion of the apertured roof 1, which is controlled by a manual switch (not shown) positioned near a driver's seat. The motor 19 has a known speed reduction gear 19a and a pinion 19b which is meshed with two geared cables 21 and 21 which are respectively associated with the left and right guide mechanisms. As is seen from FIG. 7, one geared cable 21 is slidably led into the outside cable guide groove 11 of the first rail part 13 from a rear open end of the groove 11. It is to be noted that the inside cable guide groove 11 shown in FIG. 7 is used for accommodating an induction part of the other geared cable which extends from the right guide mechanism through the pinion 19b.

Figure 10:
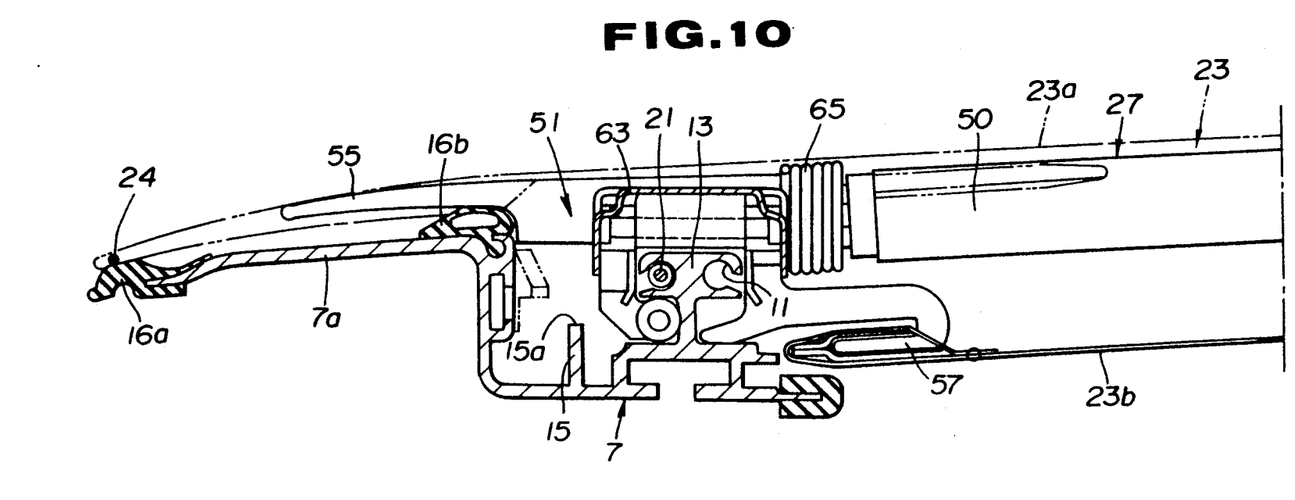
FIG. 10 is a sectional, but enlarged, view taken along the line X—X of FIG. 2.

As is seen from FIG. 10, the canvas top 23 which is carried by the left and right guide mechanisms comprises an outer leather 23a and an inner leather 23b which serves as a head lining of the passenger room. In order to sufficiently stretch the canvas top 23 upon full closing of the same, the outer leather 23a has at each lateral side a longitudinally extending wire 24 installed therein. As will be understood from the drawing, under full closing of the canvas top 23, the wire-installed lateral side and its neighbouring portion of the canvas top 23 are pressed against the weather strips 16a and 16b to achieve a watertight sealing therebetween.

As will become apparent as the description proceeds, a front part of the canvas top 23 is supported by a front carry member 25, a major middle part of the same is supported by two (viz., front and rear) guided carry members 27 and 27 and two (viz., front and rear) free carry members 27' and 27' and a rear part of the same is supported by a rear carry member 29.

As is seen from FIGS. 13 and 15, the front carry member 25 is an elongate member which extends across the sunroof aperture 9. The front carry member 25 has an upper surface fully covered with the canvas top 23 and a lower surface partially covered with a turned-back portion of the same. The leading end of the turned-back portion is fixed to the front carry member 25.

The front carry member 25 (see FIG. 13) is supported at each lateral side by a lifting mechanism 31 which is slidable along the guide member 7. As will become apparent hereinafter, the lifting mechanism 31 is so constructed as to lift and incline the front carry member 25 forwardly as shown when the member 25 assumes a position other than its frontmost position.

Figure 16:
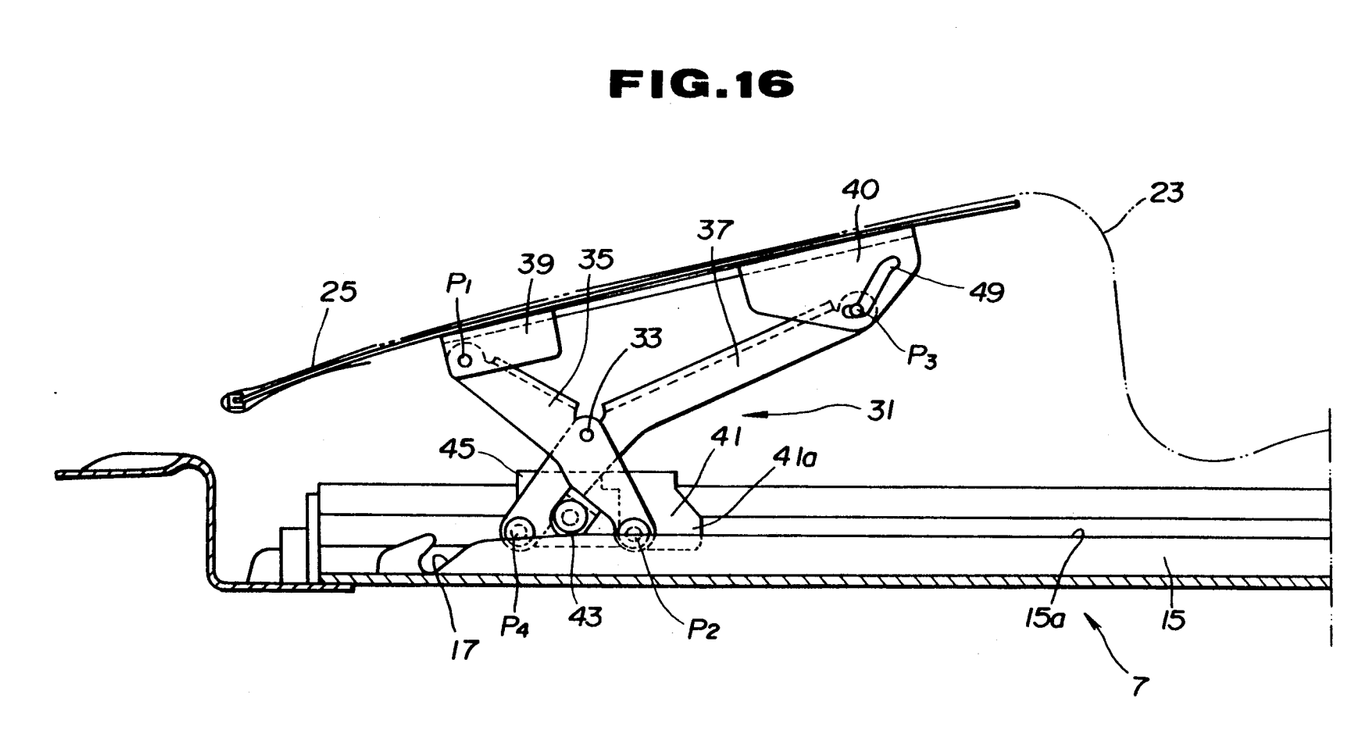
FIG. 16 is an enlarged side view of a lifting mechanism by which a front carry member of the canvas top is inclilned and lifted.

As is best shown in FIG. 16, the lifting mechanism 31 comprises first and second arms 35 and 37 which are pivotally connected through a pivot pin 33 to constitute an X-like structure. An upper end of the first arm 35 is pivotally connected through a pin $P_1$ to a front bracket 39 secured to the front carry member 25.

A lower end of the first arm 35 is pivotally connected through a pivot pin $P_2$ to a driven slider 41. The driven slider 41 has hook portions 41a which are slidably engaged with the slider guide grooves 12 of the guide member 7. The hook portion 41a is brought into abutment with a stopper 42 (see FIG. 2) of the guide member 7 when the front carry member 25 comes to its foremost position.

As is seen from FIGS. 7 and 16, the second arm 37 has a roller 43 which runs on and along the second rail part 15. As is seen from FIG. 16, an upper end of the second arm 37 has a pin $P_3$ which is slidably engaged with an elongate guide slot 49 formed in a rear bracket 40 secured to the front carry member 25. A lower end of the second arm 37 is pivotally connected through a pivot pin $P_4$ to a drive slider 45 which is slidably engaged with the slider guide grooves 12 in front of the driven slider 41.

As is seen from FIG. 7, the drive slider 45 has the geared cable 21 anchored thereto, and thus, the drive slider 45 is moved forward or rearward in response to the axial movement of the geared cable 21.

It is to be noted that when the front carry member 25 assumes its frontmost position, the roller 43 is received in the recess 17 of the second rail part 15.

The elongate guide slot 49 of the rear bracket 40 has such a shape as to correspond to the path which is described by the pin $P_3$ when the second arm 37 is pivoted about the pivot pin 33. Thus, the pin $P_3$ can smoothly slide in and along the slot 49.

As is seen from FIG. 15, the guided and free carry members 27 and 27' which support the major middle part of the canvas top 23 are four in number and are equally spaced. As shown, the guided and free carry members 27 and 27' are arranged alternately. As will become apparent as the description proceeds, the free carry members 27' are supported by the guided carry members 27 respectively.

Figure 1:
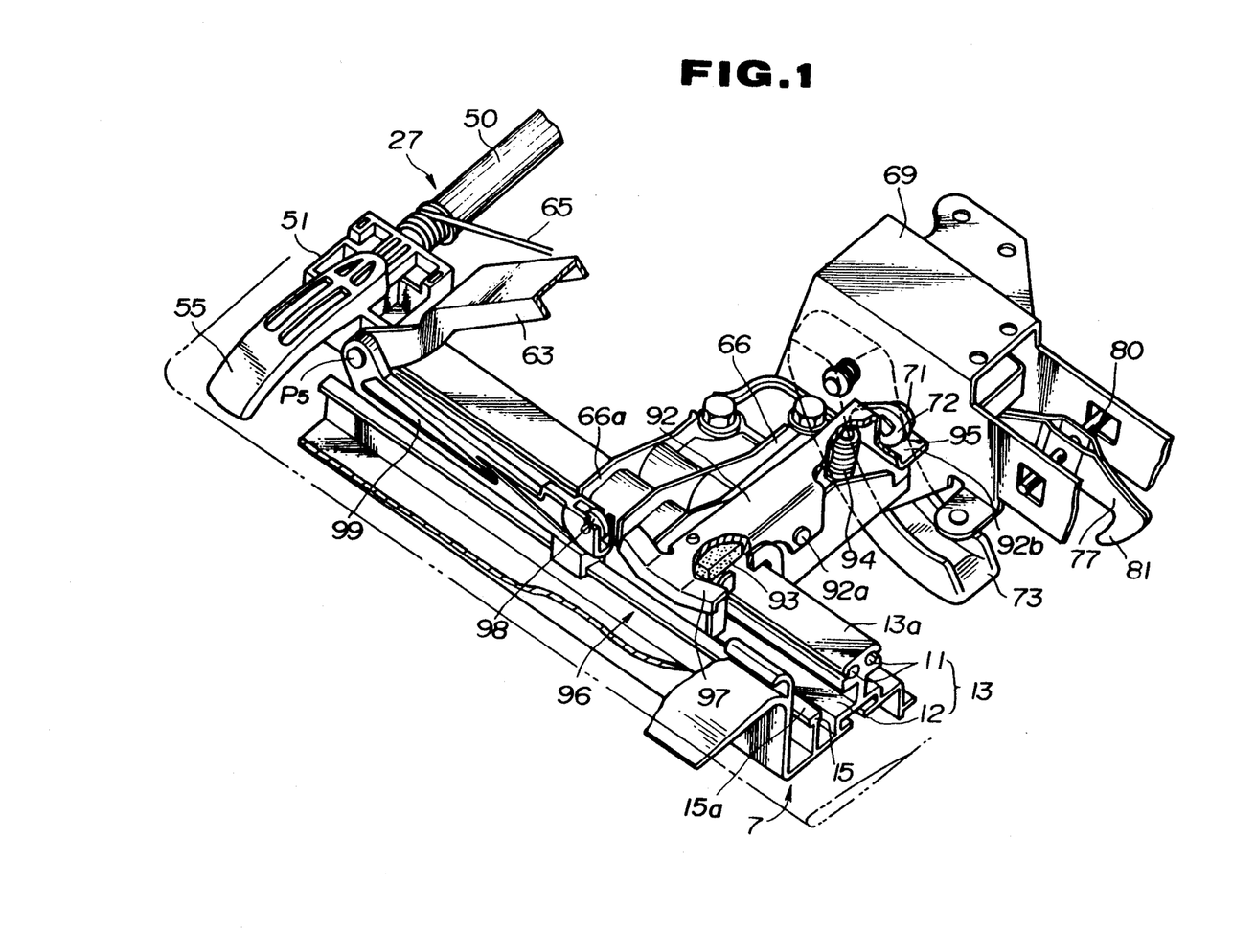
FIG. 1 is a partial perspective view of an essential part of a sunroof structure of the present invention.

As is seen from FIG. 1, each guided carry member 27 comprises a tubular bow member 50 and a guided slider 51 which nonrotatably carries thereon one end of the bow member 50. The guided slider 51 is slidably engaged with the slider guide grooves 12 of the first rail part 13 of the guide member 7.

Figure 12:
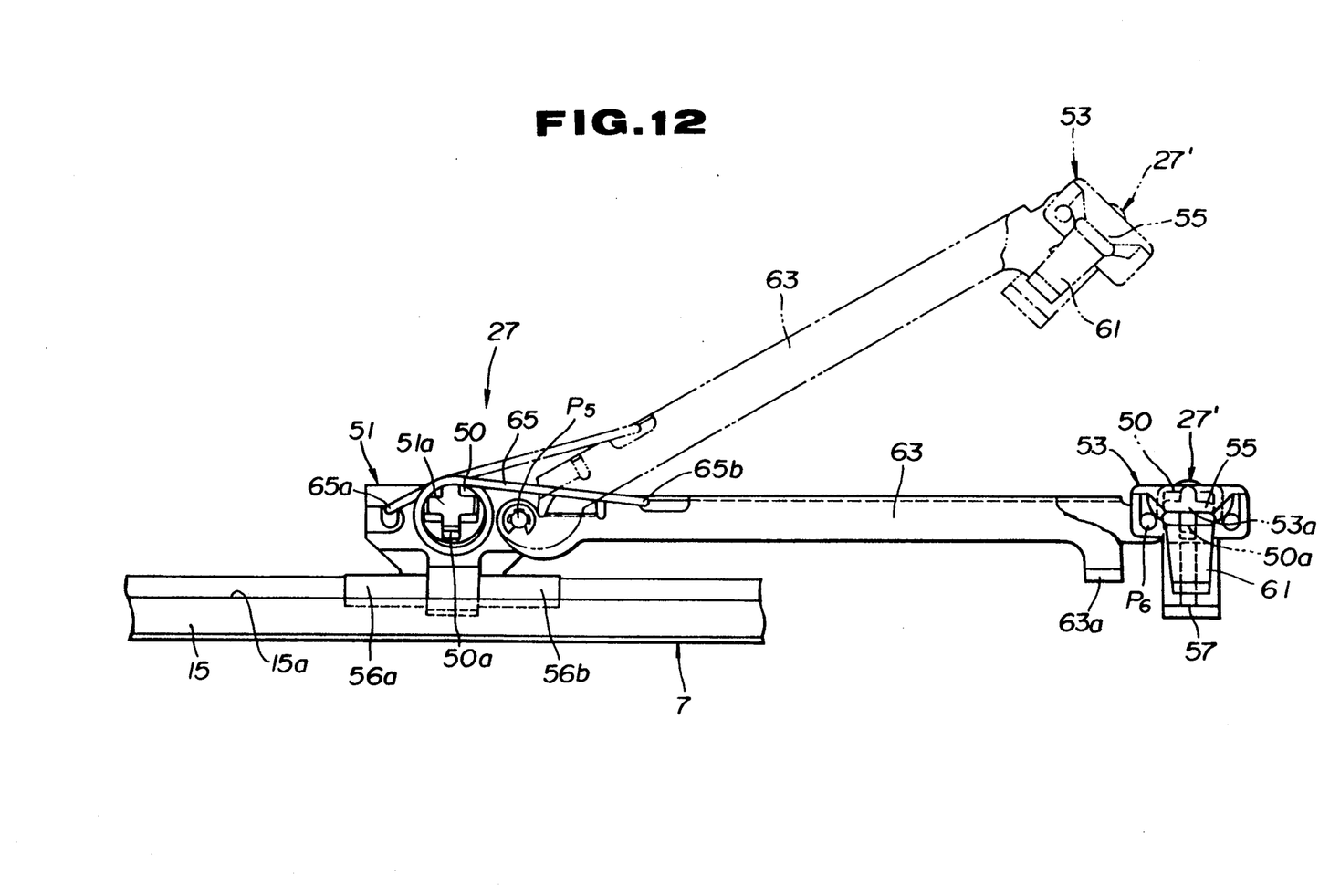
FIG. 12 is a side view of a part of the sunroof structure, showing a guided supporting bow and a free supporting bow in a condition wherein the latter bow is kept raised.

As is seen from FIG. 12, for achieving the nonrotatable connection of the bow member 50 to the guided slider 51, the guided slider 51 has a boss 51a of X-shaped cross section and each end of the bow member 50 has a recess 50a of X-shaped cross section which is mated with the boss 51a. Upon assembly, the bow member 50 is held with its middle portion somewhat raised relative to its both ends.

Each free carry member 27' comprises a tubular bow member 50 and a free slider 53 which nonrotatably carries thereon one end of the bow member 50. Similar to the case of the guided carry member 27, the free slider 53 has a X-shaped boss 53a and each end of the bow member 50 has a X-shaped recess 50a which is mated with the boss 53a.

The free slider 53 is movable upward and downward for the reason which will be described hereinafter.

As is seen from FIG. 10, each slider 51 or 53 is formed with both a first tongue portion 55 which is received in a turned-back or sack portion of the outer leather 23a and a second tongue portion 57 which is received in a turned-back or sack portion of the inner leather 23b.

Figure 11:
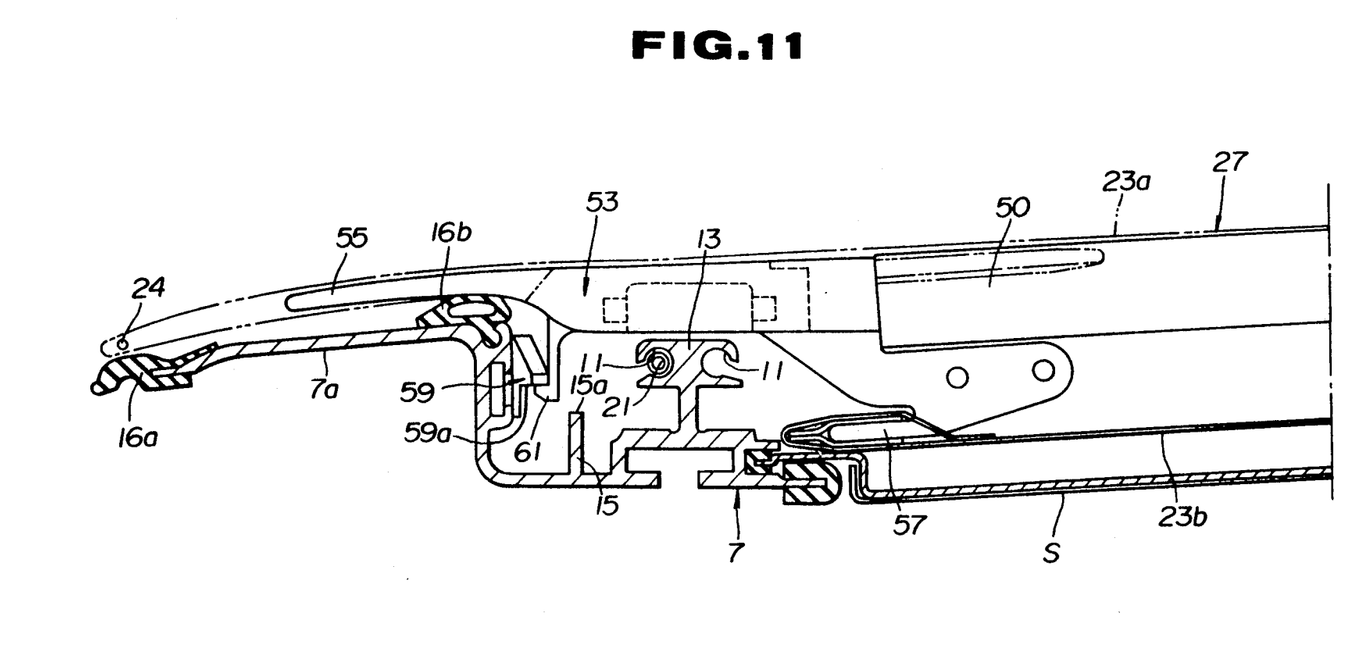
FIG. 11 is a sectional, but enlarged, view taken along the line XI—XI of FIG. 2.

Referring back to FIG. 12, the guided slider 51 is further formed with front and rear extensions 56a and 56b. The free slider 53 is provided with a hook portion 61 which, when the canvas top 23 assumes its fully closing position, is detachably engaged with an engaging member 59 (see FIG. 11) secured to the guide member 7.

It is to be noted that an engaging surface 59a of the engaging member 59 is so shaped as to permit a latching engagement between the hook portion 61 and the engaging member 59 when the hook portion 61 is pressed against the engaging member 59.

As is seen from FIG. 12, the free slider 53 is pivotally supported by a hinge arm 63 which is, in turn, pivotally mounted on the guided slider 51. The hinge arm 63 is of a channel member (see FIG. 1) and arranged with its open lower side facing downward. One (viz., lower) end of the hinge arm 63 is pivotally connected through a pivot pin $P_5$ to the guided slider 51, while, the other (viz., upper) end of the same is pivotally connected through a pivot pin $P_6$ to the free slider 53. The hinge arm 63 is formed near the top thereof with spaced lugs 63a. These lugs 63a are brought into slidable engagement with the first rail part 13 of the guide member 7 when the canvas top 23 assumes its fully closing position. Thus, under the fully closing condition, the hinge arm 63 is suppressed from lateral play.

The hinge arm 63 is biased upward by a coil spring 65 which has a multi-turned portion disposed about the boss 51a of the guided slider 51. One end 65a of the spring 65 is hooked to the guided slider 51 and the other end 65b of the same is hooked to the hinge arm 63, as shown in FIG. 12. Thus, it will be appreciated that the free slider 53 is constantly biased upward by the spring 65 with respect to the guided slider 51.

Referring back to FIG. 15, the rear carry member 29 is an elongate member which extends laterally.

Similar to the case of the afore-mentioned front carry member 25, the rear carry member 29 has an upper surface fully covered with the canvas top 23 and a lower surface partically covered with a turned-back portion of the same. The leading end of the turned-back portion is fixed to the rear carry member 29.

Figure 3:
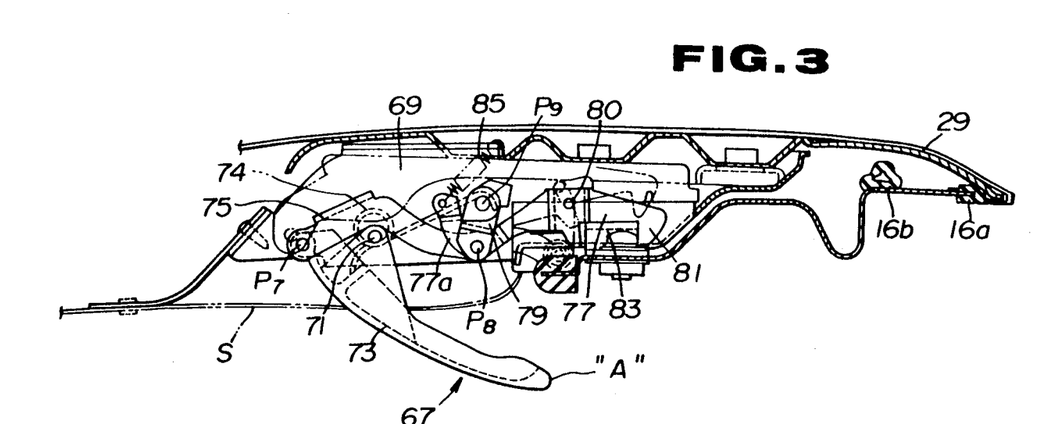
FIGS. 3 and 4 are sectional views of a manually operating mechanism employed in the invention, showing different conditions thereof respectively.

Referring to FIG. 3, there is shown a manually operating mechanism 67 which is mounted on a left side of the rear carry member 29. It is to be noted that substantially the same mechanism is mounted on a right side of the rear carry member 29. These manually operating mechanisms 67 are used for manually sliding the rear carry member 29 forward or rearward along the parallel guide members 7 of the paired guide mechanisms.

As will become apparent as the description proceeds, when a handle of each mechanism 67 is released from an operator's hand, the mechanism 67 operates to restrain the rear carry member 29 to the corresponding guide member 7.

Figure 5:
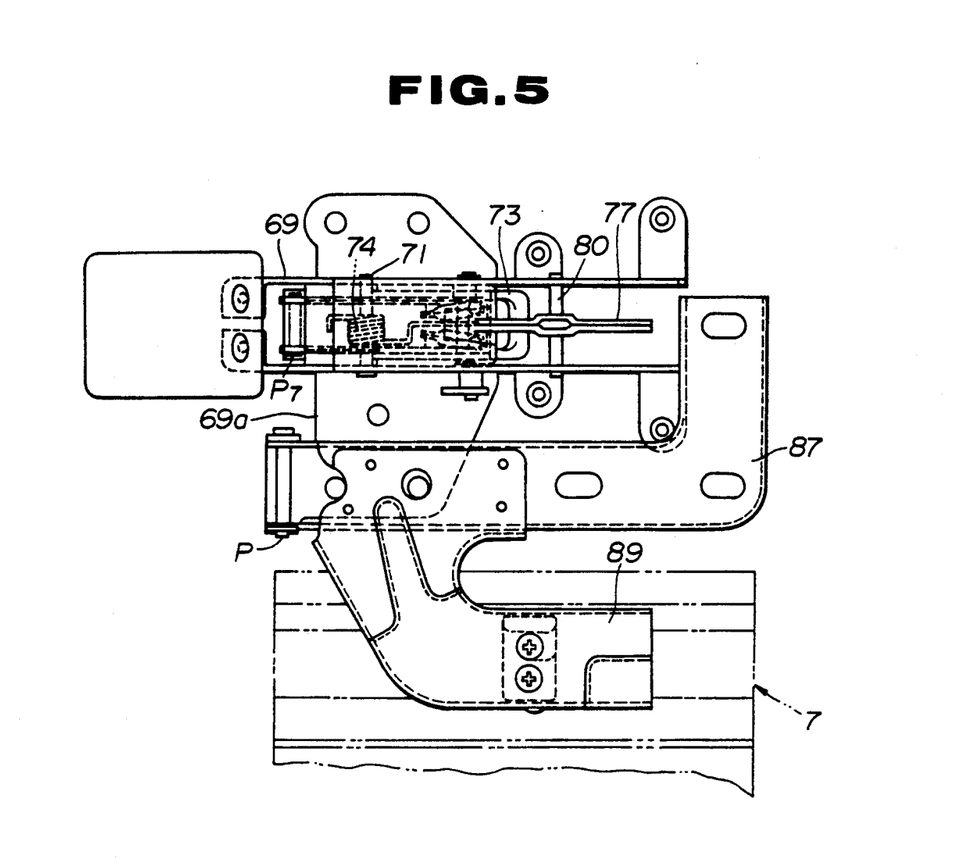
FIG. 5 is a plan view of the manually operating mechanism.

As is seen from FIGS. 1, 3 and 5, the manually operating mechanism 67 comprises a box-like bracket 69 which is arranged beneath the rear carry member 29 with an interposal of a waved panel (no numeral) therebetween. A pivot shaft 71 is rotatably held by opposed side walls of the bracket 69, as is well seen from FIG. 5. A handle lever 73 is secured to the pivot shaft 71 to pivot therewith relative to the bracket 69. The handle lever 73 has at its front end a pin $P_7$.

Figure 4:
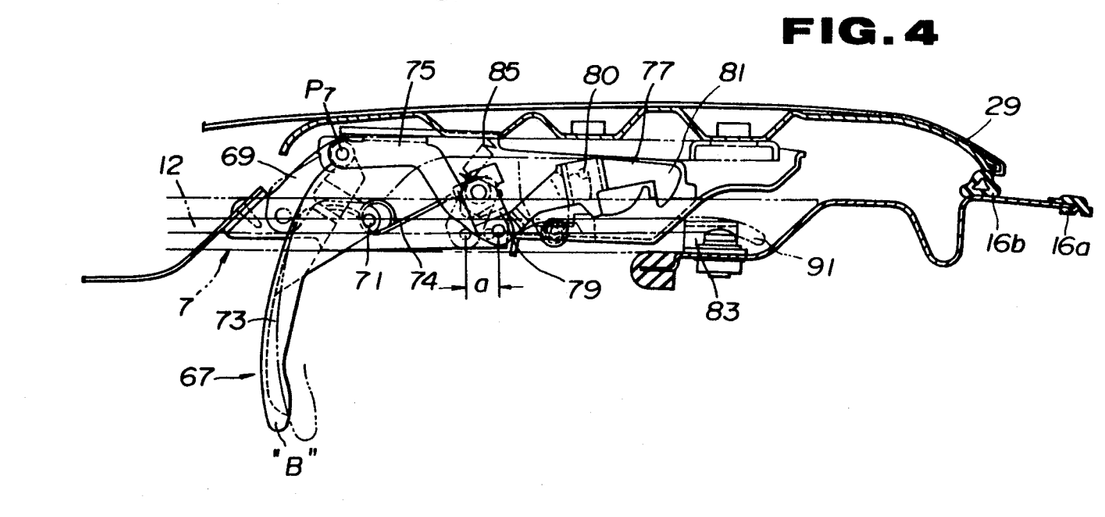

As will become clarified hereinafter, the handle lever 73 is pivotal between a folded position "A" as shown in FIG. 3 and a projected position "B" as shown in FIG. 4, these positions being delimited by an imaginary horizontal line which passes through the axis of the pivot shaft 71. That is, when the handle lever 73 is pivoted in one direction to such an extent that the pin $P_7$ goes beyond the imaginary horizontal line, the inoperative and operative conditions of the handle lever 73 change.

A coil spring 74 (see FIG. 5) is disposed around the pivot shaft 71 to bias the handle lever 73 to assume the folded position "A". The front end of the handle lever 73 is pivotally connected through the pin $P_7$ to a front end of a first link 75. A rear end of the first link 75 is pivotally connected through a common pin $P_8$ to both a base portion of a hook arm 77 and a lower end of a second link 79. An upper end of the second link 79 is pivotally connected through a pin $P_9$ to the bracket 69. The hook arm 77 has a shaft 80 which is loosely supported by the bracket 69 as is best understood from FIG. 1. That is, the opposed side walls of the box-like bracket 69 have aligned and square openings (no numerals) through which the shaft 80 passes loosely. The hook arm 77 has at its rear portion a hook 81 which, when moved downward, is latchingly engageable with a striker 83 secured to the rear end of the sunroof aperture 9, more specifically, to the roof panel 1. The hook arm 77 has an upwardly extending front portion 77a. The front portion 77a holds one end of a spring 85 of which the other end is held by the bracket 69, so that the hook arm 77 is biased to pivot in a clockwise direction in FIG. 3, that is, in a direction to bias the hook 81 downwardly.

When the handle lever 73 is in the folded position "A", the first link 75 is kept inclined forward. Under this condition, the hook 81 assumes a position available to effect the latched connection with the striker 83. While, when the handle lever 73 is in the projected position "B", the first link 75 is kept horizontal. Under this condition, the hook 81 assumes a position to disengage from striker 83.

It is to be noted that when the handle lever 73 is pivoted from the projected position "B" as shown in FIG. 4 to the folded position "A" as shown in FIG. 3, the second link 79 is turned about the pin $P_9$ in a clockwise direction in FIG. 4 by a degree corresponding to the distance "a". This means that the hook arm 77 is pulled forward by a distance corresponding to the distance "a". Thus, when, with the hook 81 kept latched with the striker 83, the handle lever 73 is pivoted from the projected position "B" to the folded position "A", the rear carry member 29 is moved rearward by a distance corresponding to the distance "a" thereby tightly tensioning the entire of the canvas top 23.

Figure 6:
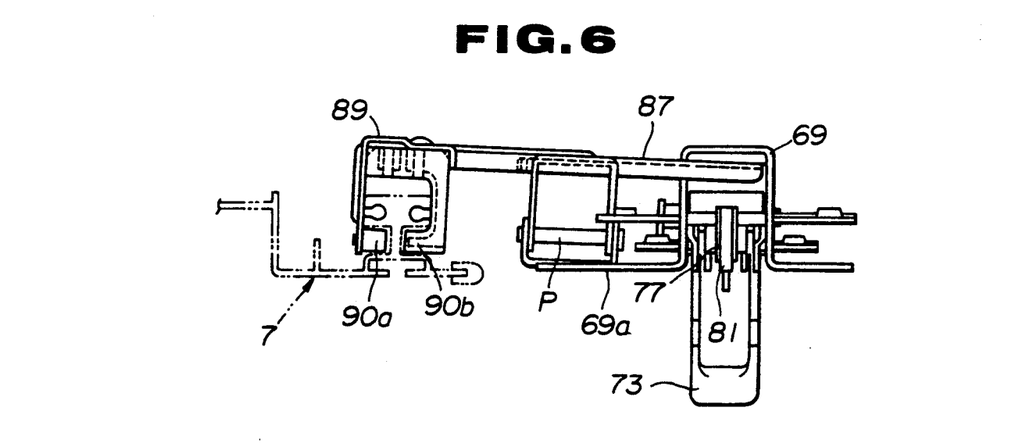
FIG. 6 is a rear view of the manually operating mechanism.

As is seen from FIGS. 5 and 6, a hinge member P is mounted on a base portion 69a of the bracket 69, from which a generally L-shaped mounting arm 87 and a generally J-shaped engaging arm 89 extend rearwardly and leftwardly, respectively, as shown. The mounting arm 87 is fixed to the rear carry member 29. Due to the hinge member P (more specifically, the two hinge members P arranged at left and right sides of the rear carry member 29), the rear carry member 29 is pivotal upward and rearward relative to the bracket 69.

As is seen from FIG. 6, the engaging arm 89 has at its leading end portion mutually facing projections 90a and 90b which are slidably engaged with the slider guide grooves 12 of the first rail part 13 of the guide member 7. When the canvas top 23 assumes its fully closing position, the projections 90a and 90b are put in the downwardly bent ends 91 of the grooves 12 thereby to bias the rear portion of the canvas top 23 downward. With this, the rear carry member 29 is tightly pressed against the weather strips 16a and 16b to achieve watertight sealing therebetween.

As is seen from FIG. 1, the bracket 69 has a supporting member 66 secured thereto. The supporting member 66 has a slidable gripper 66a which has opposed projections slidably engaged with the slider guide grooves 12.

A brake mechanism brakes the forward and rearward movements of the rear carry member 29. The brake mechanism comprises a brake arm 92 which is pivotally connected at its generally middle portion to the supporting member 66 through a pivot pin 92a. An outer end of the brake arm 92 is equipped with a brake shoe 93 of a rubber material or the like, which is brakingly engageable with an upper flat surface 13a of the first rail part 13 of the guide member 7. A coil spring 94 is disposed between an inner end of the brake arm 92 and the supporting member 66, so that the brake shoe 93 is constantly pressed against the upper flat surface 13a.

The brake shoe 93 is released from the upper flat surface 13a when actuation of first or second releasing means 95 or 96 takes place, as will be described in the following.

The first releasing means 95 comprises a cam member 72 which is secured to the pivot shaft 71 of the handle lever 73. The cam member 72 is placed on an innermost flange part 92b of the brake arm 92 in such a manner that when the handle lever 73 is pivoted forward in FIG. 1, the cam member 72 pushes the innermost flange part 92b downward against the force of the spring 94 thereby to pivot the brake arm 92 in a clockwise direction (as viewed in FIG. 1) about the pivot pin 92a. With this, the brake shoe 93 is lifted or disengaged from the upper flat surface 13a of the first rail part 13.

The second releasing means 96 comprises a T-shaped head portion 97 integrally formed on the outermost end of the brake arm 92. The head portion 97 protrudes over the second rail part 15 of the guide member 7. The front and rear lugs of the head portion 97 are somewhat inclined with respect to an upper flat surface 15a of the second rail part 15, as shown. The second releasing means 96 further comprises a roller arm 99 which has a front end pivotally connected through a pin $P_5$ to the guided slider 51 of the rear guided carry member 27. The roller arm 99 extends rearward along and on the second rail part 15 and has at its rearmost end a roller 8.

When the canvas top 23 is folded, raising the free carry members 27', the roller 98 is thrusted under the head portion 97 of the brake arm 92 thereby to disengage the brake shoe 93 from the upper flat surface 13a of the first rail part 13. Due to the inclination which the front and rear lugs of the head portion 97 have, the thrusting of the roller 98 under the head portion 97 is smoothly carried out.

Figure 2:
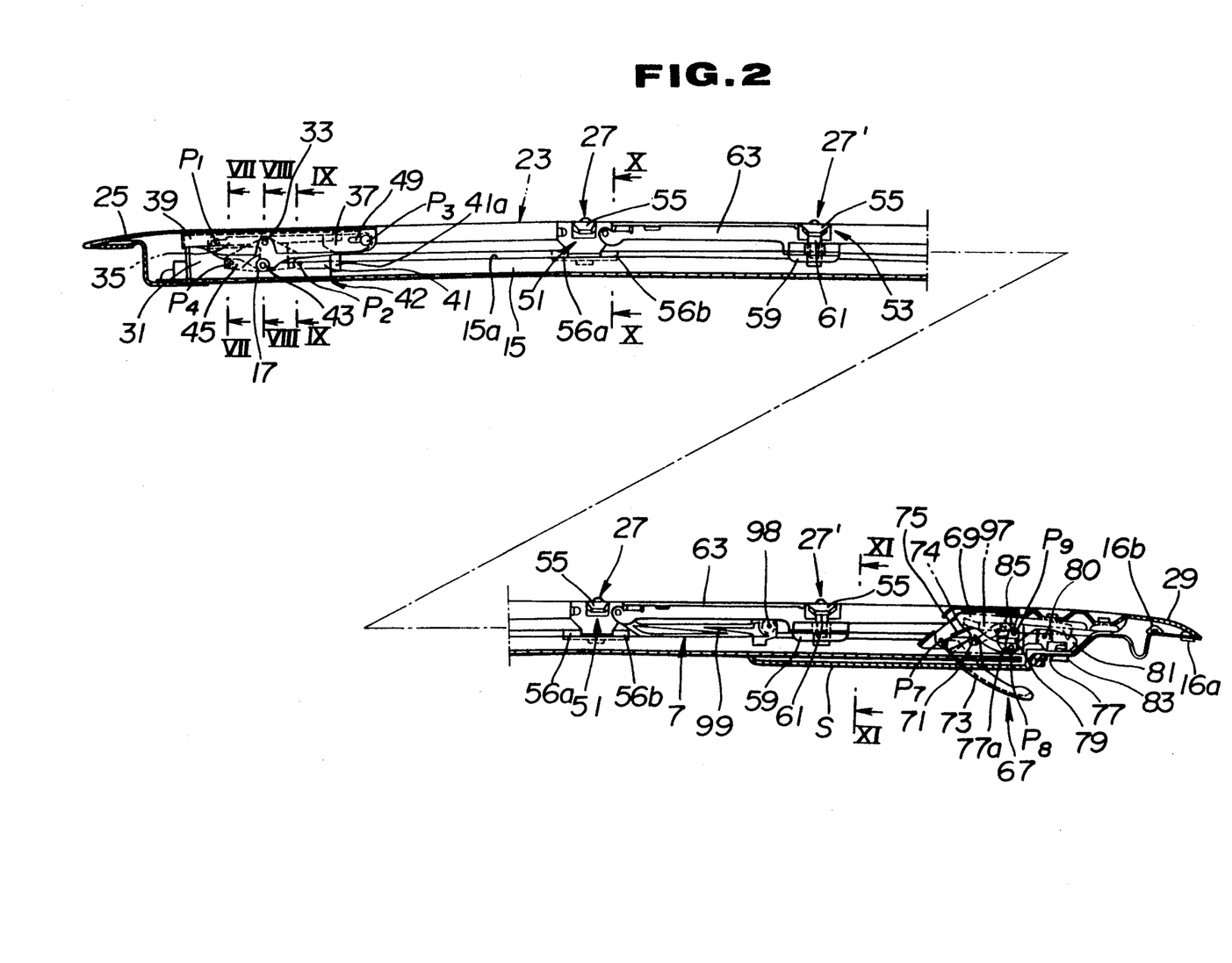
FIG. 2 is a horizontally sectional view of a canvas top type sunroof structure of the present invention, showing a fully closed condition thereof.

As will be understood from FIG. 2, a shade plate "S" is secured to the base portion 69a of the bracket 69, which conceals, from passengers in the vehicle, the various parts mounted under the rear carry member 29.

In the following, operation of the sunroof structure of the present invention will be described with reference to the drawings.

For ease of understanding, the description will be commenced with respect to a fully closed condition of the sunroof structure wherein the sunroof aperture 9 is fully closed by the canvans top 23, as shown in FIG. 2.

Under this closed condition, the front carry member 25 is placed at its frontmost position and kept stationarily due to the nature of the geared cable 21 meshed with the pinion 19b of the motor 19 (see FIG. 15) and the rear carry member 29 is placed at its rearmost position having the hook arm 77 latched with the striker 83 as shown in FIG. 3.

When, due to energization of the electric motor 19, the geared cable 21 is moved rearward, the front carry member 25 becomes inclined forward, due to operation of the lifting mechanism 31 and then the front carry member 25 is moved rearward with its posture kept inclined.

When the driven slider 41 of the lifting mechanism 31 comes to contact with and pushes the front extension 56a of the foremost positioned guided slider 51, the guided slider 51 is moved rearward together with the associated free slider 53 disengaging the hook portion 61 of the free slider 53 from the engaging member 59 of the guide member 7. Thus, the first free carry member 27' is gradually raised due to the force of the coil spring 65 in response to the rearward movement of the guided slider 51.

Then, the rear extension 56b of the foremost positioned guided slider 51 comes to contact with and pushes the front extension 56a of the next-positioned guided slider 51 causing the next-postioned free carry member 27' to be gradually raised. Finally, the front carry member 25 comes to its rearmost position having two folds of the canvas top 23 formed behind the lifted and inclined front carry member 25, as shown in FIG. 13.

When, due to reenergization of the electric motor 19, the geared cable 21 is moved forward in FIG. 13, the front carry member 25 is moved forward with its posture kept inclined. The forward movement of the front carry member 25 pulls, by means of the canvas top 23, the foremost positioned guided slider 51, and the next-positioned guided slider 51 one after another. When the front carry member 25 comes to its foremost position, the canvas top 23 fully closes the sunroof aperture 9, as is seen from FIG. 2.

When now the handle lever 73 is pivoted forward to assume the projected position "B", the hook 81 of the hook arm 77 is disengaged from the striker 83. Thus, thereafter, the rear carry member 29 is permitted to move forward when pushed forward with the handle lever 73 kept pushed.

When now the handle lever 73 is released from the operator's hand, the handle lever 73 is pivoted backward to the folded position "A" due to the biasing spring 74. Thus, under this condition, the sunroof structure assumes a so-called "rear open mode" wherein a rear part of the sunroof aperture 9 is opened.

It is to be noted that, under this rear open mode, the brake shoe 93 of the brake mechanism (more specifically, two brake shoes 93 of the left and right brake mechanisms) is kept pressed against the first rail part 13 of the guide member 7, so that the rear carry member 29 is brakingly retained to the guide member 7. Thus, even when the vehicle runs with the sunroof structure assuming the rear open mode, it does not occur that the rear carry member 29 is unexpectedly moved back to the rearmost position. Of course, unexpected forward movement of the rear carry member 29 is suppressed even when the vehicle is subjected to a rapid braking.

When the handle lever 73 is pivoted forward again, the inoperative condition of the brake mechanism is obtained and thus the rear carry member 29 is permitted to move forward or rearward by the hand or hands of the operator.

When, with the sunroof structure assuming the rear-open mode, the electric motor 19 is energized, the front carry member 25 is moved rearward, opening the front part of the sunroof aperture 9. It is to be noted that during the rearward movement of the front carry member 25, the rear carry member 29 keeps the open position due to the function of the brake mechanism. Under this, the handle lever 73 is in the folded position "A". Thus, a so-called "front-rear open mode" is established by the sunroof structure.

When, due to a continuous operation of the electric motor 19, the front carry member 25 is moved back to a certain position close to the rear carry member 29, the roller 98 of the second releasing means 96 is thrusted under the head portion 97 of the brake arm 92 thereby disabling the brake mechanism. Thus, thereafter, the front carry member 25 and the rear carry member 29 are both moved rearward in response to the continuous operation of the electric motor 19.

When, due to the operation of the continuous electric motor 19, the rear carry member 29 comes to its rearmost position, the hook 81 of the hook arm 77 is brought into a latching engagement with the striker 83 as is seen from FIG. 13.

When now the electric motor 19 is energized to run in a reversed direction, the front carry member 25 is moved forward and finally to its frontmost position. Thus, the fully closed condition of the sunroof structure is established.

As will be understood from the foregoing description, in the sunroof structure of the present invention, there is employed a brake mechanism by which the rear carry member 29 of the canvas top 23 is brakingly retained to the guide member 7 even when the same assumes an open position.

Although the brake mechanism described in the foregoing uses a brake shoe 93 which is adapted to brakingly contact with the first rail part 13 of the guide member 7, another type brake mechanism may be employed, which for example comprises a rack extending along and secured to the guide member 7 and a latching pawl connected to the head portion 97 of the brake arm 92. That is, the restraining of the rear carry member 29 to the guide member 7 is effected by effecting the latching engagement between the latching pawl and the rack.

What is claimed is:

1. A sunroof structure for a vehicle having an aperture formed in its roof, comprising:
    a pair of guide members which extend along respective sides of said aperture;
    a canvas top adapted to cover said aperture;
    a carry member having a terminal part of said canvas to secured thereto, said carry member being slidably guided by said guide members;
    latching means for latching said carry member to one end of said aperture when said carry member comes to a given terminal position with respect to said aperture;
    a brake mechanism for retaining said carry member to one of said guide members when said carry member assumes a position other than said given terminal position, said brake mechanism including a bracket structure connected to said carry member, to move therewith, a supporting member having one end secured to said bracket structure and the other end slidably guided by said one of said guide members, a brake arm pivotally connected to said supporting member, brake means positioned at one end of said brake arm relative to asid one of said guide members and for retaining said carry member when said brake arm is pivoted in a given direction, and first biasing means for biasing said brake arm to pivot in said given direction; and
    first releasing means incorporated with the latching means, the first releasing means pivoting said brake arm in a non-engaged direction opposite to said given direction when said latching means is actuated to unlatch said carry member from the guide member.

2. A sunroof structure as claimed in claim 1, further comprising second releasing means for pivoting said brake arm in the direction opposite to said given direction when the other terminal part of said canvas top is brought to a position near said carry member.

3. A sunroof structure as claimed in claim 2, in which said first releasing means comprises:
   a pivot shaft pivotally held by said bracket structure;
   a handle level secured to said pivot shaft to pivot therewith;
   a link mechanism operatively connecting said handle lever to said latching means;
   a cam secured to said pivot shaft, said cam being in contact with the other end of said brake arm, so that when said handle lever is pivoted in a given direction, said cam presses the other end of said brake arm and thus pivots said brake arm in a first direction against the biasing force of said first biasing means; and
   second biasing means for biasing said handle lever to pivot in a second direction.

4. A sunroof structure as claimed in claim 3, in which said second releasing means comprises:
   a generally T-shaped head portion formed on the one end of said brake arm;
   a roller arm which extends from said other terminal part of said canvas top toward said head portion; and
   a roller rotatably held on a leading end of said roller arm, said roller arm and said roller being so arranged that when said roller arm is brought to a given position due to movement of the other terminal part of said canvas top, said roller is thrusted under said generally T-shaped head portion thereby to pivot said brake arm against said first biasing means.

5. A sunroof structure as claimed in claim 4, in which said brake means comprises:
   a brake shoe of rubber material, said brake shoe being secured to the one end of said brake arm; and
   an elongate rail portion formed on said guide member, said brake shoe being brakingly engageable with said elongate rail portion.

6. A sunroof structure as claimed in claim 3, in which said link mechanism comprises:
   a first link having one end pivotally connected to said handle lever;
   a second link having one end pivotally connected to said bracket structure and the other end pivotally connected to the other end of said first link through a pivot shaft;
   a hook arm having one end portion pivotally connected to said shaft and the other end formed into a hook which is latchingly engageable with a striker which is connected to said roof at a fixed end portion of said aperture; and
   loosely holding means for loosely holding said hook arm to said bracket structure.

7. A sunroof structure as claimed in claim 6, in which said loosely holding means comprises:
   means defining aligned rectangular openings in opposed side walls of said bracket structure; and
   a shaft having said hook arm secured thereto, said shaft loosely passing through said aligned rectangular openings.

8. A sunroof structure as claimed in claim 4, in which the T-shaped portion includes two lug portions, the two lug portions being somewhat inclined in order to facilitate the thrusting of said roller under said T-shaped head portion.

9. A sunroof structure for a vehicle having an aperture formed in a roof of the vehicle, comprising:
   a pair of guide members which extend along respective sides of said aperture;
   a canvas top adapted to cover said aperture;
   a front carry member having a front part of said canvas top secured thereto, said front carry member being slidably guided by said guide members;
   guided carry members slidably guided by said guide members and carrying thereon a major middle part of said canvas top;
   free carry members pivotally carried by said guided carry members, respectively, each free carry member carrying thereon a part of said canvas top;
   biasing means for biasing each free carry member upward relative to an associated guided carry member;
   a rear carry member having a rear part of said canvas top secured thereto, said rear carry member being slidably guided by said guide members;
   electric drive means for driving said front carry member forward and rearward along said guide members;
   latching means for latching said rear carry member to said roof at a rear fixed portion of the aperture when said rear carry member reaches its rearmost position;
   a brake mechanism associated with said rear carry member to restrain said rear carry member by attachment to one of said guide members when said rear carry member assumes a position other than the rearmost position, the brake mechanism being pivotable into and out of engagement with the guide means by operation of either the latching means or a rearmost guided carry member.

10. A structure as claimed in claim 9, in which said brake mechanism comprises:
    a bracket structure connected to said rear carry member by a hinge;
    a supporting member having end secured to said bracket structure and the other end slidably guided by the guide member;
    a brake arm pivotally connected to said supporting member;
    a brake shoe connected to one end of said brake arm in such a manner that when said brake arm is pivoted in a given direction, said brake shoe is brought into a frictional contact with the guide member; and
    first biasing means for biasing said brake arm to pivot in said given direction.

11. A sunroof structure as claimed in claim 10, further comprising:
    first releasing means for pivoting said brake arm in a direction opposite to said given direction when said latching means is actuated in a manner to unlatch said rear carry member from said rear fixed portion of said roof aperture; and
    second releasing means for pivoting said brake arm in the direction opposite to said given direction when the front carry member is brought to a position near said rear carry member.

12. A sunroof structure as claimed in claim 11, in which said first releasing means comprises:
    a pivot shaft pivotally held by said bracket structure;
    a handle lever secured to said pivot shaft to pivot therewith;

a link mechanism operatively connecting said handle lever to said latching means; and a cam secured to said pivot shaft, said cam being in contact with the other end of said brake arm, so that when said handle lever is pivoted in a given direction, said cam presses the other end of said brake arm and thus pivots the same in a first direction against the biasing force of said first biasing means.

13. A sunroof structure as claimed in claim 12, in which said second releasing means comprises:

a generally T-shaped head portion formed on the one end of said brake arm;

a roller arm which extends from one of said guided carry members toward said generally T-shaped head portion; and a roller rotatably held on a leading end of said roller arm, said roller arm and said roller being arranged that when the guided carry member is brought to a given position, due to movement of said front carry member, said roller is thrusted under said generally T-shaped head portion thereby to pivot said brake arm in said first direction to disengage the brake means from the guide member.

14. A sunroof structure as claimed in claim 12, in which said link mechanism comprises:

a first link having one end pivotally connected to said handle lever;

a second link having one end pivotally connected to said bracket structure and the other end pivotally connected to the other end of said first link through a pivot shaft;

a hook arm having one end portion pivotally connected to said shaft and the other end formed into a hook which is latchingly engageable with a striker which is secured to the fixed rear portion of the roof opening; and loosely fitted holding means for holding said hook arm to said bracket structure.

15. A sunroof structure as claimed in claim 14, in which said loosely fitted holding means comprises:

means defining aligned rectangular openings in opposed side walls of said bracket structure; and a shaft having said hook arm secured thereto, said shaft loosely passing through said aligned rectangular openings.

16. A sunroof structure as claimed in claim 15, in which lug portions of a generally T-shaped head portion of said brake arm are inclined in order to facilitate the thrusting of said roller thereunder.

* * * * *